Nov. 14, 1967 G. W. HOWARD 3,352,153
DRIVE BELT TENSION DETERMINING APPARATUS
Filed Aug. 13, 1965 2 Sheets-Sheet 1
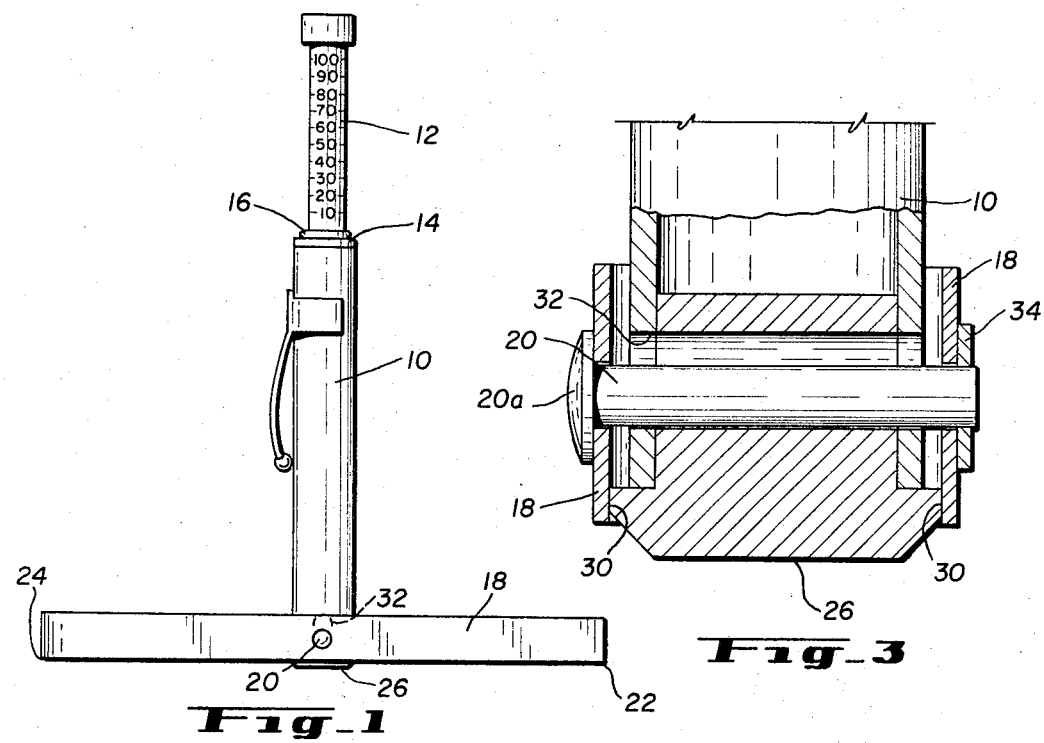
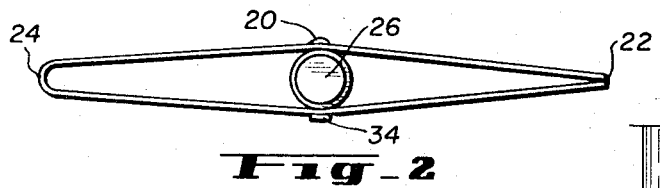
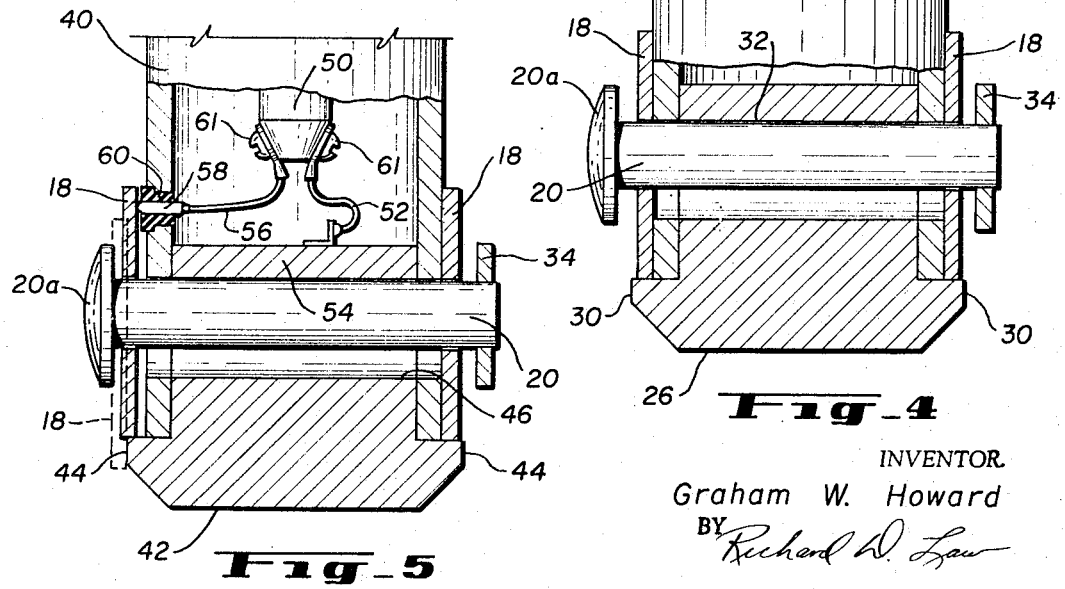
INVENTOR.
Graham W. Howard
BY
ATTORNEY Nov. 14, 1967  G. W. HOWARD  3,352,153
DRIVE BELT TENSION DETERMINING APPARATUS
Filed Aug. 13, 1965  2 Sheets-Sheet 2
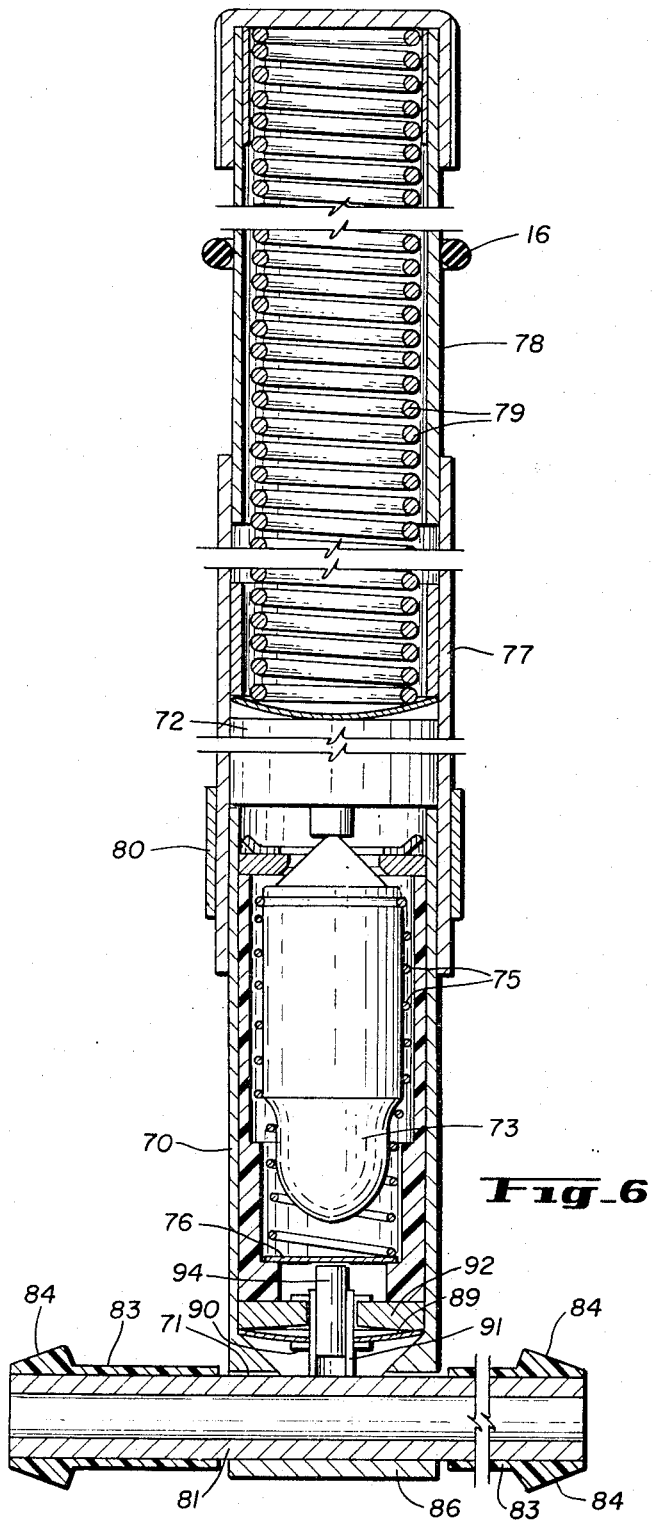
Fig_6
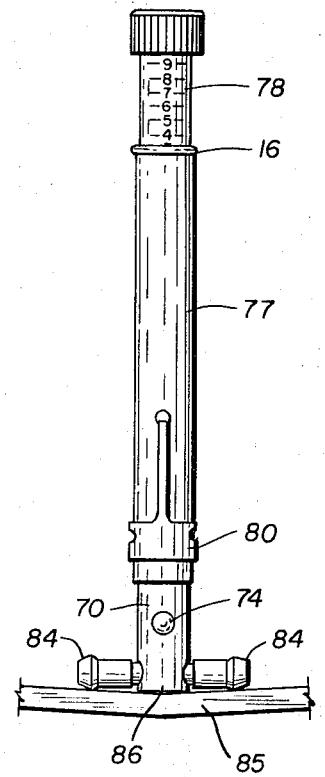
Fig_7
INVENTOR.
Graham W. Howard
BY
ATTORNEY

United States Patent Office 3,352,153
Patented Nov. 14, 1967

1

3,352,153
DRIVE BELT TENSION DETERMINING
APPARATUS
Graham W. Howard, 5996 S. Crocker Way,
Littleton, Colo. 80120
Filed Aug. 13, 1965, Ser. No. 479,421
11 Claims. (Cl. 73—144)

This invention relates to apparatus for determining the tension on a drive belt and more particularly to improvements in a drive belt tension tester having automatic signaling means to indicate when proper position of the tester on the belt is obtained.

In U.S. Patent No. 3,171,278, issued Mar. 2, 1965, for Belt Tension Tester, to Graham W. Howard, Jr., there is described a simple and effective belt tensioning tester which may be used to determine the tension of a drive belt between two pulleys. The tester utilizes a three-point contact of the tester on a predetermined amount of depression of one stretch of the endless belt. The principle of the tester is to provide three points of contact, which on depressing the belt to a predetermined depression, touch the belt. The tester includes two spaced contacting points and a single central point displaced from the linear alinement between the two spaced points. Means are provided to determine the amount of pressure necessary to cause the three-point contact with the belt. The belt tension tester described in the aforementioned patent is very effective so long as the user can ascertain that there is actually three-point contact between the three points of the tester and the belt. In poorly lighted places, it is sometimes extremely difficult to ascertain when the contact between the three points has been made.

According to the present invention, I have provided an improvement in a belt tension tester which automatically indicates when the pressure to make a three-point contact with a belt has been achieved. In one form of the invention, I provide a lost motion connection between the bail of the tester (which provides the two spaced-apart points) and the central point of the tester (which provides the third point) for producing an audible sound when the three-point contact between the tester and the belt is achieved. In a modified version, the audible signal may be provided as well as a visual signal by providing a small lamp that lights as soon as the three-point contact has been made. In one form, the spring of the bail of the tester is used to snap against the body of the tester, and in another form a spring washer makes an audible noise when the three-point suspension is achieved.

Included among the objects and advantages of the present invention is to provide an audible signal for a belt tension tester.

Another object of the invention is to provide a visual signal for a belt tension tester.

A still further object of the invention is to provide a simplified system for ascertaining the achieving of a three-point contact of a belt testing device.

These and other objects and advantages of the invention may be readily ascertained by referring to the following description and appended illustrations in which:

FIG. 1 is a side elevational view of the assembly of a belt tension testing device according to the invention;

FIG. 2 is a bottom, plan view of the device of the invention illustrating the positioning of the bail in relation to the main body thereof;

FIG. 3 is an enlarged detailed view of fastening means of the bail of the belt testing device including the lost motion connection and showing the cocked position of the bail;

FIG. 4 is an enlarged detail of the fastening device of the bail in its closed position indicating that three-point contact has been made;

2

FIG. 5 is an enlarged detail view in cross-section of a slightly modified form of the invention for providing a visual signal as well as an audible signal when three-point contact is made with the belt;

FIG. 6 is a cross-sectional view of a modified form of the invention utilizing a spring washer for sound and a battery and light for visual indication of attaining a predetermined arc on a belt; and FIG. 7 is a side elevation of the tester of FIG. 6.

A typical belt tester on which the invention may be used is shown in FIGS. 1 and 2, wherein a main hollow barrel 10 is provided with a reciprocable plunger 12 which has a scale marked thereon. A spring, not shown, is mounted around the plunger internally of the barrel and is arranged as a tension spring. The structure is set forth in detail in the above-identified patent. One type of spring is a helical spring which is attached to the cap 14 of the barrel 10 and the end of the plunger so that as the plunger is depressed internally of the barrel, greater pressure is needed to stretch the spring therein. The spring normally biases the plunger 12 outwardly. An O-ring 16 (of rubber or similar material) is mounted on the plunger and it is arranged to move up and down on the plunger to indicate the furthest penetration of the plunger into the barrel. This is readily accomplished by having the O-ring rest against the cap 14 during depressing movement of the plunger. The O-ring retains its position on the plunger when the plunger returns to outer position and the O-ring indicates the deepest penetration by its position on the scale. A bail 18 mounted on a pin 20 provides means for achieving a three-point contact with the belt. The contact points are end 22, its opposite end 24 and end 26 of the main barrel 10.

It has been determined that a bail 6.4 inches from point to point and with central point 26 extending 0.1000 inch below the line of the points 22, 24, pressure necessary to depress the plunger is a direct function of the tension on the belt. The scale may thus be calibrated in terms of actual pounds of force to make a three-point contact and/or may be calibrated as a function of tension on the belt.

An audible signal may be provided by providing the tip of the barrel 26 (FIGS. 3 and 4) with an annular shoulder 30 extending radially of the barrel 10 a distance at least about as wide as the width of the metal of the bail 18. The bail pin 20 is mounted in an elongated hole 32 extending through the barrel 10. A washer 34 on the end of the pin opposite head 20a secures the pin. As shown in FIG. 3, the pin 20 is arranged to rest in the bottom of the elongated hole 32, or as shown in FIG. 4, against the top of the elongated hole 32. The width of the bail 18 is such that when the pin is in the bottom of the hole it must be sprung open and reset on the shoulders 30. When the pin is at the top of the hole the bail must rest against the body 10. For size described above, with the pin at the top of the hole 32, the distance from the bottom of the bail to the point 26 is 0.1000 inch. Also, the bail is made of metal which provides substantial resiliency so that its sides are biased inwardly.

In using the device, prior to a test, the bail is spread and the pin is pushed down so that both sides of the bail rest on the shoulders 30 of the tip 26 and the pin is resting on the bottom of the hole 32. The tester is then placed on the belt between two sheaves and pressure is exerted on the plunger 12. Since the belt stretch being tested is essentially straight, the center point 26 contacts the belt. The O-ring 16, of course, is resting against the cap 14. Pressure on the plunger is exerted which pushes contact 26 depressing the belt until the two ends of the bail 22 and 24 are firmly in contact with the belt. At the proper pressure to make firm three-point contact, the bail will move off the shoulders 30 and will snap onto the barrel 10 making a distinct and audible sound.

Thus, the distinct and audible sound indicates that necessary pressure has been applied to the plunger to produce a three-point contact and further pressure is not needed. On removing the device from the belt, the spring returns the plunger outwardly, leaving the O-ring at the point of deepest penetration. The position of the O-ring on the scale of the plunger indicates the tension on the belt, when the scale is so calibrated.

In the modification shown in FIG. 5, a barrel 40 is provided with a belt contacting tip 42 having an annular shoulder 44 therearound. The bail 18, again, is mounted on a pin 20 having a head 20a and a washer 34 for maintaining the pin in position. The barrel 40 is provided with an elongated opening 46 in which the pin is arranged to move from a lower to an upper position. At the lowermost position of the pin the bail 18 rests on the shoulder 44 and in its uppermost position the bail rests against the barrel 40. A visual signal means is provided by means of a battery and light device, indicated at 50, but not completely shown since these are preferably of a conventional flashlight design, i.e., a penlight battery and lamp. The switching means for the flashlight mechanism is a lead 52 attached to a brace 54 inside the barrel 40 which provides a ground. The lead 52 is in electrical contact with the brace 54 which in turn is in electrical contact with the barrel. The other lead 56 of the flashlight is attached to a contact 58 mounted through an insulating plug 60 in the wall of the barrel 40. Each lead 56 and 52 is secured to the flashlight by means of a bolt 61. The leads to the bolts 61 are attached in conventional manner to opposite poles of the battery in the flashlight device.

When the bail is mounted and resting on the shoulder 44 of the tip 42, it is seen that the bail is not in contact with the contact 58, the position being shown by the dashed lines 18, and in this position the circuit to the flashlight bulb is open. However, when the bail is moved off of the shoulder 44 in contact with the barrel 40, the bail is in touch with the contact 58, closing the circuit and lighting the flashlight bulb. By providing orifices in the barrel around the bulb, the light may readily be seen when it is on. The belt tester is used in a manner to that described above, producing an audible signal as well as the visual signal. With the visual signal an audible signal need not be used.

In the modification shown in FIGS. 6 and 7, an audible signal and a visual indicator shows when the tester has depressed a belt to provide a three-point contact. A case 70 with a lateral opening 71 therethrough houses a battery 72 and light bulb 73 combination. The exact configuration, of course, depends on the type, size and style of the battery (power cell) and lamp. The lamp is mounted in plastic tube (for transmitting light through a series of windows 74, FIG. 7) in the case. The lamp is mounted by an electrical conducting spring 75 in contact with one pole of the battery. The spring is maintained in contact with a switch contact plate 76. The battery is mounted in electrical connection with a shell 77 which is mounted over and in electrical contact with the case, both being aluminum or other electrical conducting material. An indicating tube 78 is mounted in the shell and a spring 79 provides tension biasing the tube outwardly. The tube is calibrated and marked as explained above. A clip 80 provides means for holding the tester in a pocket.

The case 78 has a lateral feeler bar 81 mounted in the openings 71, which openings are elongated to permit the feeler bar movement at least along the axis of the shell. The feeler bar may have a feeler bar cap 83 on each end thereof. The end 84 of each cap is beveled to rest fully on a belt 85 (FIG. 7) when the belt is depressed to the desired arc. A center point (or surface) 86 on the bottom of the case provides for the third contact point.

An audible signal is provided by a spring washer 89. The washer is dished and is placed with the dish down so that pressure on the center by means of a washer 90 mounted on a switch post 91 snaps the washer upwardly causing an audible signal. The feeler bar moving upwardly, of course, provides the movement of the switch post. A backing washer 92 backs up the spring washer and through the switch post biases the feeler bar to the extremity of the openings 71. A switch adjustment pin 94 is mounted in switch post 91 and provides means for contacting the switch contact plate 76 completing the circuit to light the lamp. The post and pin are conducting material as is the feeler bar which is in contact with the case; thus, when the pin contacts the plate, the circuit through the case and shell to the battery is closed.

When not pressed on a belt, the feeler bar 81 is biased outwardly by the spring washer. When depressed on a belt to three-point contact, the spring washer 91 snaps in with an audible sound and the pin 94 contacts the switch plate 76 so that the lamp lights. Thus, an audible and visual indication is given. With the O-ring 16 moved against the shell prior to use, depressing the spring loaded tube 78 moves it up the tube to the position where three-point contact is made. A scale on the tube is calibrated in pounds, or otherwise, to give a reading of the pressure required to make the three-point contact.

While the invention has been illustrated by reference to specific devices, there is no intent to limit the spirit or scope of the invention to the precise details so set forth, and obvious equivalents which may occur to those skilled in the art are within the concept as defined in the following claims.

I claim:

1. In a belt tester of the class described having an elongated body portion and a bail normal thereto and extending outwardly from both sides of said body portion, the improvement of a lost motion connection between said bail and said body permitting limited movement of said bail along said body portion; means temporarily maintaining said bail at either extreme end of said movement; and signal means associated with said means temporarily maintaining said bail for indicating bail movement from one extreme position to the other position.

2. In a bail tester of the class described having a generally tubular body portion and a bail normal thereto and extending outwardly from both sides thereof, the improvement of a lost motion connection between said bail and said body permitting limited axial movement along said body from a starting position to a measuring position; spring biasing means maintaining said bail at said starting position and permitting movement toward said measuring position; and signal means associated with said spring biasing means indicating movement from the starting position to the measuring position.

3. In a belt tester, an elongated body; a member mounted through said body and having ends arranged to extend laterally of said body providing spaced apart belt contacting points; a belt contacting tip on said body; there being extending portions adjacent the ends of said member laterally of said body for temporarily supporting said member on a belt; said member being mounted for limited movement along said body from a resting position adjacent said belt contacting tip to a measuring position; means biasing said member toward said body; and signal means associated with said biasing means and said body to indicate contact between said body and said member at the measuring position opposite said resting position.

4. In a belt tester, an elongated body; a member mounted on said body and having opposed ends arranged to extend laterally of said body providing spaced apart belt contacting points; a belt contacting tip on said body; extending shoulder portions adjacent said tip laterally of said body for temporarily supporting said member, said member being mounted for limited movement along said body from a resting position on said extending shoulder portions to a position contacting said body; spring means biasing said member toward said body; and signal means associated with said body and said member to indicate contact between said body and said member.

5. In a belt tester, an elongated body; a bail mounted on said body and having ends arranged to extend laterally of said body providing spaced apart belt contacting points, said bail being a U-shaped member with legs mounted on opposed sides of said body and spring biased together toward said body; a belt contacting tip on said body; extending shoulder portions adjacent said tip and normal to said body for temporarily supporting said bail thereon, said bail being mounted for limited movement along said body from a resting position on said extending shoulder portions to a position contacting said body; and signal means associated with said body and said bail to indicate contact between said body and said bail.

6. In a belt tester according to claim 5, wherein said bail and said body are of materials wihch cooperatively produce an audible sound when said bail is moved from said shoulder portions into contact with said body.

7. In a belt tester according to claim 5, wherein said signal means includes a visible light and a power source therefor; and switch means activated by said bail being in contact with said body away from said shoulder portions.

8. In a belt tester according to claim 5, wherein said signal means includes an audible signal and a visual signal both actuated by the movement of said bail from said shoulder portions into contact with said body.

9. In a belt tester, an elongated body; a member mounted through said body and having opposed ends arranged to extend laterally of said body providing spaced apart belt contacting points; a belt contacting tip on said body; said member being mounted for limited movement along said body from a resting position adjacent to said belt contacting tip to a measuring position opposite said resting position; spring washer means biasing said member toward said belt contacting tip; and means contacting said washer and said body to distend said washer on movement of said member to cause an audible signal.

10. In a belt tester, an elongated body; a member mounted through said body and having ends arranged to extend laterally of said body providing spaced apart belt contacting points and arranged for movement along said body from a resting position to a measuring position; spring bias means biasing said member toward said resting position; a belt contacting tip on said body; a battery and lamp mounted in said body and having a normally open circuit; said spring bias means arranged to complete the circuit for the battery and lamp when in measuring position; and said spring bias means arranged to transmit an audible signal when said member moves into measuring position.

11. In a belt tester according to claim 10, wherein said audible signal means and said lamp is lighted simultaneously when said member moves to said measuring position and said lamp remains lit while said member is in said measuring position.

References Cited
UNITED STATES PATENTS

| | | | |
|---|---|---|---|
| 2,320,023 | 5/1943 | Zimmerman | 73—139 |
| 2,368,757 | 2/1945 | Graham | 73—144 |
| 3,174,334 | 3/1965 | McKernan | 73—144 |
| 3,296,857 | 1/1967 | Kaczeus | 73—144 |

JAMES J. GILL, *Primary Examiner.*

JAMES H. WILLIAMSON, *Assistant Examiner.*